Patented Dec. 19, 1939

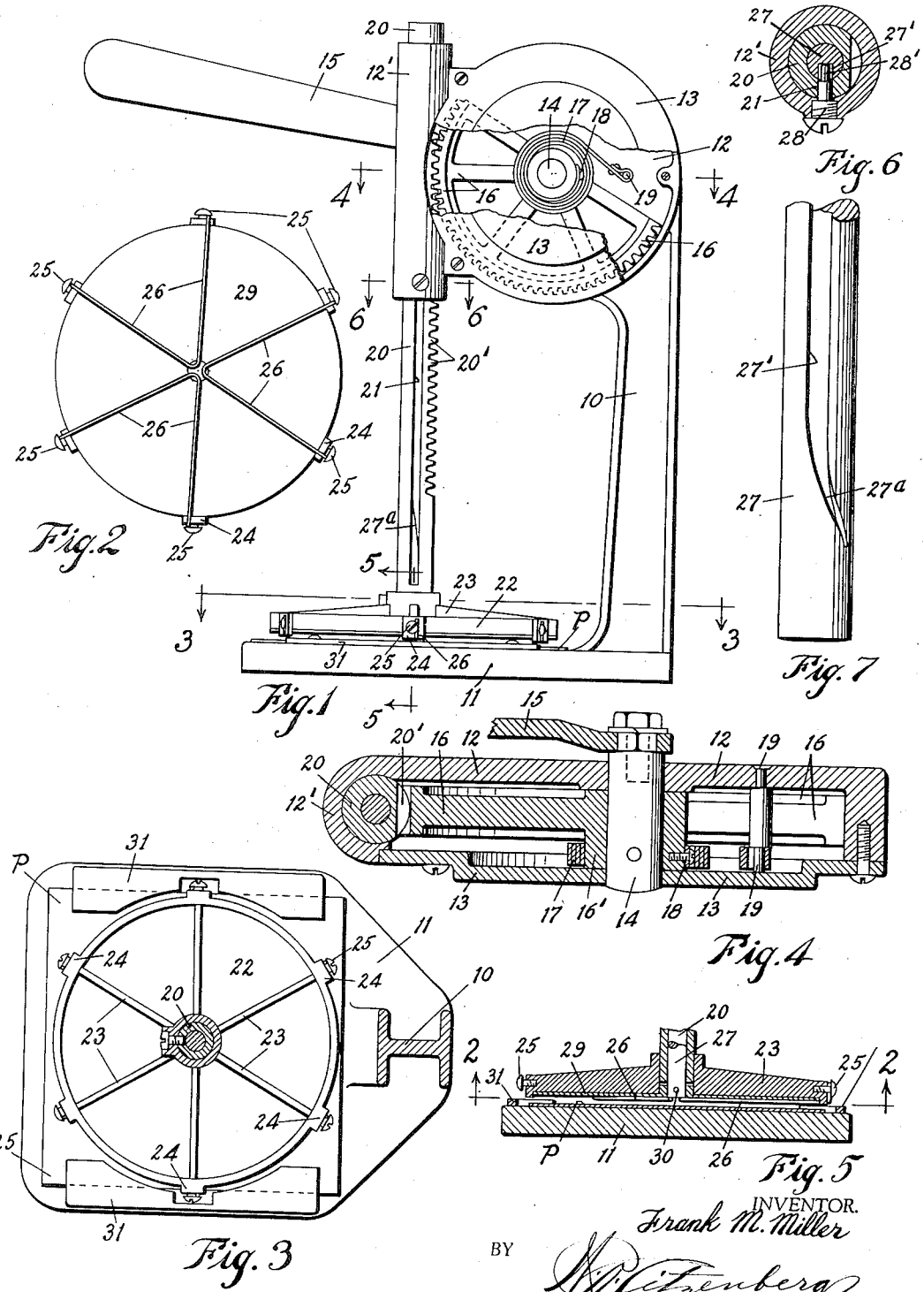

2,184,080

UNITED STATES PATENT OFFICE 2,184,080

HAMBURGER PRESS

Frank M. Miller, Santa Monica, Calif.

Application December 29, 1938, Serial No. 248,294

6 Claims. (Cl. 107—15)

My invention relates to hamburger presses designed for pressing meat balls into cakes ready to be fried or otherwise treated.

It is common to prepare hamburger cakes on tissue or waxed paper ready to be conveniently handled and placed on the frying plate so as to save time when an order is given.

The object of my invention is to provide a machine which will hold a quantity of tissue papers in a pile ready to have a meat ball placed upon the top paper, with a pressure disc adapted to be moved down upon said meat ball to press it into disc or cake form and to lift said meat cake and the paper adhering thereto from the pile of tissue papers, with means for causing said meat make and paper to drop from said pressure disc or member as it is moved to its raised position.

Another object of my invention is to provide a new and useful means in connection with the pressure disc for releasing the meat cake therefrom so that it will fall on to the hand of the operator, said means including means for causing a partial rotation of one part of said pressure mechanism, whereby to release the meat cake adhering thereto.

In order to fully explain my invention, I have shown on the accompanying sheet of drawings one practical embodiment of the same, which I will now describe.

Figure 1 is a side elevation of a machine embodying my invention;

Figure 2 is a bottom plan view of the pressure disc or member on the end of the plunger;

Figure 3 is a horizontal sectional view taken on line 3—3 of Fig. 1;

Figure 4 is a horizontal sectional view taken on the line 4—4 of Fig. 1;

Figure 5 is a vertical sectional view taken on the line 5—5 of Fig. 1;

Figure 6 is a cross sectional view taken on line 6—6 of Fig. 1; and Figure 7 is a view of the lower end of the cam rod within the plunger rack.

Referring in detail to the drawing, my invention as here illustrated includes a main body or casting 10, having a base 11, and a head 12, said head having a removable side plate 13, on one side, as indicated in Figs. 1 and 4.

Mounted through the head and side plate is a shaft 14, having on one end an operating lever 15. On said shaft, within said head, is a segmental gear 16, secured to the shaft to turn therewith when the operating lever is moved up and down. On the hub 16' of said gear 16 is a coiled spring 17, one end of which is secured to said hub, as at 18, and the other end of which is secured to the inside of the head 12, by means of a pin 19, as seen in Fig 4. This spring operates to turn the gear 16 to raise the plunger, again referred to.

In the front of said head 12, is formed a cylindrical member 12' within which vertically moves a round shaft or plunger member 20, having teeth 20' cut in one side thereof, to mesh with the gear segment 16, as indicated in Figs. 1 and 4, whereby said plunger member 20 can be raised and lowered by the operation of the lever 15. Said plunger member is of tubular form and has cut through its side, for a part of its length, a slot 21.

Mounted on the lower end of said plunger member 20 is a pressure head 22, having the radial webs 23, and the bosses 24, with screws 25, 25 set therein, for supporting wire members, as 26 on the underside of said pressure head, as indicated in Fig. 2.

Rotatably mounted in said tubular plunger member 20, is a cam rod 27, having therein a cam groove 27', positioned to register with the slot 21, as seen in Fig. 1, and in Fig. 6, while the lower end of said cam groove 27' spirals a part of a turn, as indicated at 27a, Figs. 1 and 7, for a purpose now to be explained. A set screw or cam screw 28 is inserted through the side of the cylindrical member 12', more clearly shown in Fig. 6, with a portion extending through the slot 21, and a reduced portion 28' extended into said cam groove 27', so that as said plunger member with the cam rod are raised, at the finish of the up movement, the cam rod will be given a partial turn by reason of the cam groove 27' and the cam screw 28 operating therein.

Mounted on the lower end of said cam rod 27 is a disc 29, which rests snugly up under the bottom of the pressure head 22, above the wire members 26, as seen in Figs. 2 and 5, said disc being secured to said cam rod with a through pin 30, as indicated in Fig. 5.

Thus when the cam rod is turned a partial turn as it reaches the limit of the up movement, said disc 29 is also turned relative to said pressure head 22 and said wire members 26.

Mounted on the base 11 is a pile of square tissue papers, as P, held in place by the overlapping members 31, 31.

Use and operation

The device described is used as follows:
A ball of meat is placed upon the top tissue paper. The pressure head being in its up position when the meat ball is placed thereunder, is now moved down by the operation of the lever 15, until it presses the meat ball into a cake upon the tissue paper. As the lever is moved to raise said pressure head, the meat cake and the top tissue paper adheres thereto and is raised therewith until it reaches the up position, whereupon the cam rod 27 and the disc 29 are turned a partial turn, the wires 26, 26, being stationary, and this causes said meat cake and the tissue paper thereunder to drop off into the hand of the operator, who has placed his hand under the pressure head as it rises to the up position. These meat cakes, on the tissue paper, are then laid aside for use when an order comes in.

It will be understood that a cup dipper such as is used for dipping ice cream can be used to deposit a ball of meat upon the top paper P, and that the movement of the lever 15 downwardly moves the pressure head down upon said meat ball and it can be pressed into a cake of the desired thickness and then as the lever is raised, the meat cake adheres to the disc 29, and the wires 26, and the top paper adheres to the meat cake, so that as the pressure head reaches its up position, the disc 29 is given a partial turn and the meat cake with the paper under it drops into the hand of the operator. It is the relative movement of the disc 29 to the wires 26 which causes the meat cake to be released and to drop by gravity into the hand of the operator.

While I have shown and described one practical embodiment of my invention, I am aware that changes in the details of construction and arrangement can be made without departing from the spirit of the invention, and I do not, therefore, limit the invention to the details shown and described, except as I may be limited by the hereto appended claims.

I claim:

1. In a machine for making hamburgers, a body having a base to receive papers on which meat balls are placed, a plunger with pressure head, means for moving said plunger and pressure head down to press said meat ball into a cake, a disc carried on the underside of said pressure head to engage with said meat ball, fixed means on the face of said disc to engage with the meat ball, and means for causing a rotative movement of said disc on its upward movement to release a meat cake from said pressure head and said disc.

2. In a machine of the character referred to, a body having a base, a head, a plunger operable through said head toward said base, a pressure head on the lower end of said plunger, a disc rotatably supported up under said pressure head, wire members held by said pressure head over the under face of said disc, means for causing a partial rotation of said disc relative to said wires to release a meat cake pressed thereupon, whereby said meat cake will drop therefrom, and an operating handle for raising and lowering said pressure head.

3. In a machine of the character referred to, a pressure head adapted to be moved down upon a meat ball to flatten it into a cake, means for moving said pressure head, a member on the pressure face of said pressure head adapted to be rotated a partial turn relative to said head, wire members held by the pressure head over the face of said member, whereby said member is turned relative to said pressure head and said wire members, to release a meat cake from said member, means for raising said pressure head, member and wire members up and down to compress a meat ball thereunder, and means for causing a partial rotation of said member relative to said wire members.

4. A machine for pressing meat balls and the like into cakes, including a body having a base with means for receiving and holding papers to receive the meat balls thereon, a plunger with head movably mounted in said body, means for operating said plunger and said head to and from said base to press said meat balls, a meat engaging face plate on the under side of said head, wire members across the surface of said face plate, between the meat and said face plate, and means for causing relative movement between said face plate and said wires after a pressing movement to release the meat cake from said face plate.

5. A machine for pressing meat balls and the like into cakes, including a body with a base to receive meat balls thereon, a plunger with head movably mounted in said body, means for operating said plunger and said head to and from said base to press meat balls into cakes, said head having a meat engaging face plate on the under side thereof, releasing members on the face of said face of plate, between the meat and said face plate, and means for causing relative movement between said face plate and said members after a pressing operation to cause the release of said cake.

6. A hamburger press including a pressure head having a meat engaging face to be moved down upon a ball of meat to press it into a cake, wire members across said face between the meat and said face, and means operable to cause a relative movement between said meat engaging face plate and said wire members to cause the release of a meat cake adhering thereto.

FRANK M. MILLER.